United States Patent [19]

Sono et al.

[11] Patent Number: 5,752,478

[45] Date of Patent: May 19, 1998

[54] CONTROL SYSTEM FOR INTERNAL COMBUSTION ENGINES

[75] Inventors: Hiroshi Sono; Ken Ogawa, both of Wako, Japan

[73] Assignee: Honda Giken Kogyo K.K. (Honda Motor Co., Ltd. in English), Tokyo, Japan

[21] Appl. No.: 591,380

[22] Filed: Jan. 25, 1996

[30] Foreign Application Priority Data

Jan. 27, 1995 [JP] Japan .................. 7-031394

[51] Int. Cl.⁶ .................................. F02B 29/00
[52] U.S. Cl. .................. 123/90.11; 123/90.15
[58] Field of Search .............. 123/90.11, 90.15; 251/129.01, 129.05

[56] References Cited

U.S. PATENT DOCUMENTS

| | | | |
|---|---|---|---|
| 3,882,833 | 5/1975 | Longstaff et al. | 123/90.11 |
| 4,957,074 | 9/1990 | Weissler, II et al. | 123/90.11 |
| 5,072,700 | 12/1991 | Kawamura | 123/90.11 |
| 5,190,013 | 3/1993 | Dozier | 123/90.11 |
| 5,222,714 | 6/1993 | Morinigo et al. | 251/129.16 |
| 5,327,856 | 7/1994 | Schroeder et al. | 123/90.11 |
| 5,596,956 | 1/1997 | Ogawa et al. | 123/90.11 |

FOREIGN PATENT DOCUMENTS

| | | |
|---|---|---|
| 0 376 714 A2 | 7/1990 | European Pat. Off. . |
| A-0 451 829 | 10/1991 | European Pat. Off. . |
| A-2 616 481 | 12/1988 | France . |
| 3 019 109 A1 | 11/1981 | Germany . |
| 2-112606 | 4/1990 | Japan . |
| WO-A-92 02712 | 2/1992 | United Kingdom . |

OTHER PUBLICATIONS

Patent Abstracts of Japan, vol. 011, No. 078 (M-570) [2525], Mar. 10, 1987 & JP-A-61 2342313 (Yanmar Diesel Engine Co. Ltd.), Oct. 18, 1986 *Abstract*.

*Primary Examiner*—Weilun Lo
*Attorney, Agent, or Firm*—Arthur L. Lessler

[57] ABSTRACT

A control system for an internal combustion engine having a plurality of cylinders each having at least one intake valve, at least one exhaust valve, and a crankshaft. The control system has an electromagnetic driving section which electromagnetically causes opening and closing of at least one of the at least one intake valve and the at least one exhaust valve. A crank angle sensor generates a crank angle signal whenever the crankshaft rotates through a predetermined angle, and a cylinder position sensor generates a cylinder-discriminating signal indicative of a predetermined crank angle of a particular cylinder of a plurality of the cylinders. A piston position sensor detects an operating state or position of the piston of each of the plurality of the cylinders, based on the generated crank angle signal and the generated cylinder-discriminating signal. A CPU starts opening of the at least one of the at least one intake valve and the at least one exhaust valve, based on the detected operating state of the piston.

2 Claims, 15 Drawing Sheets

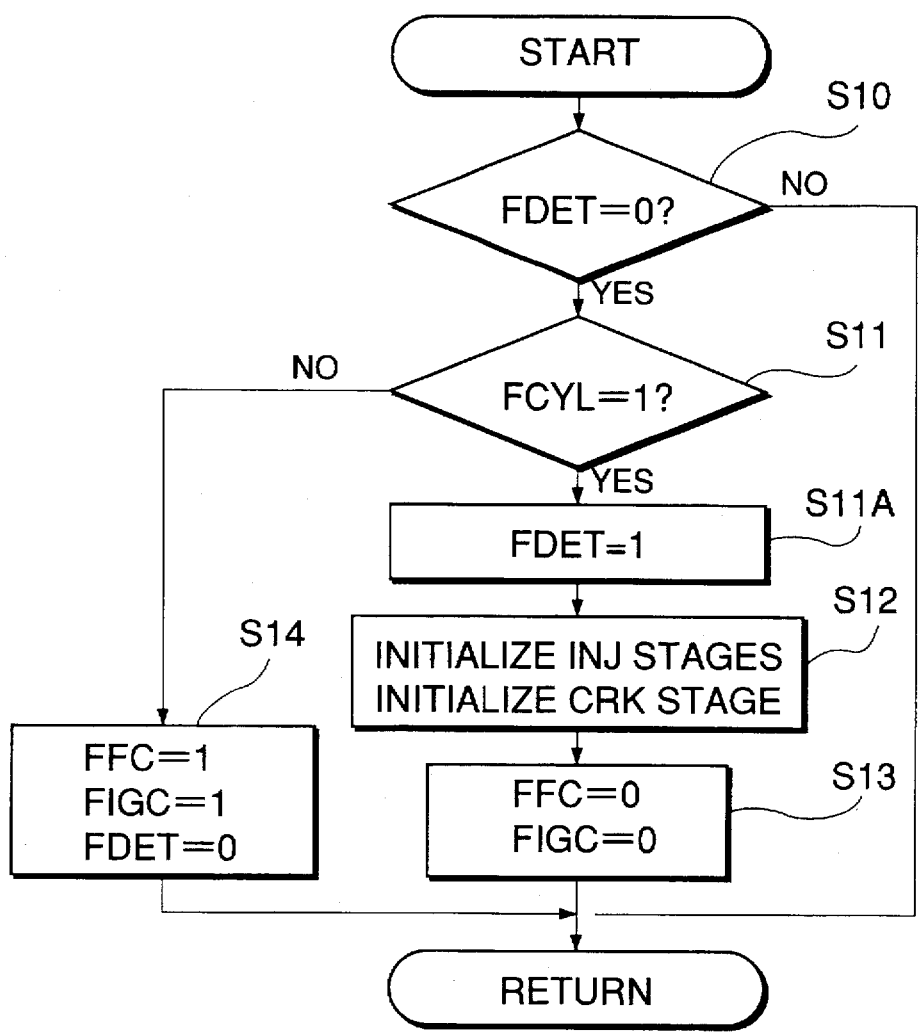

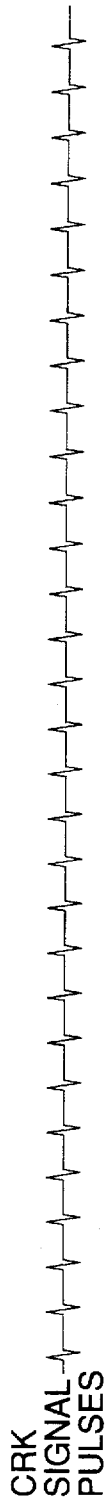

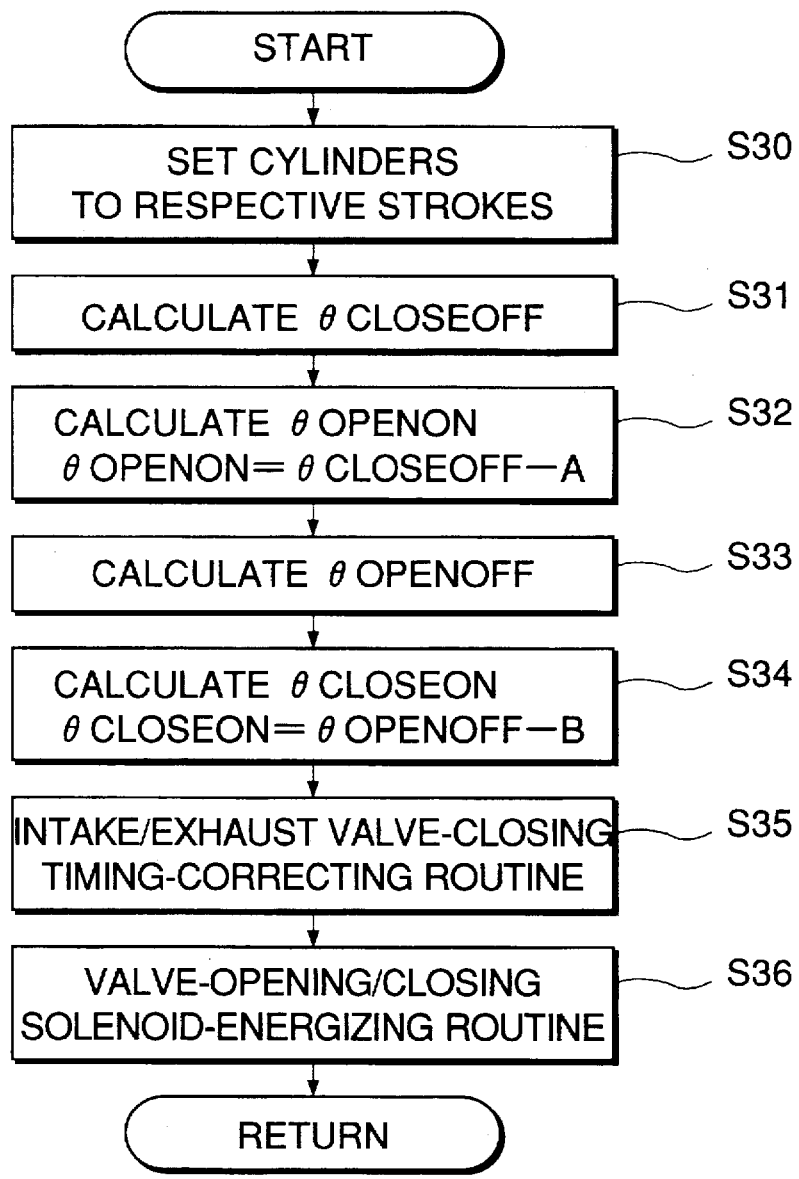

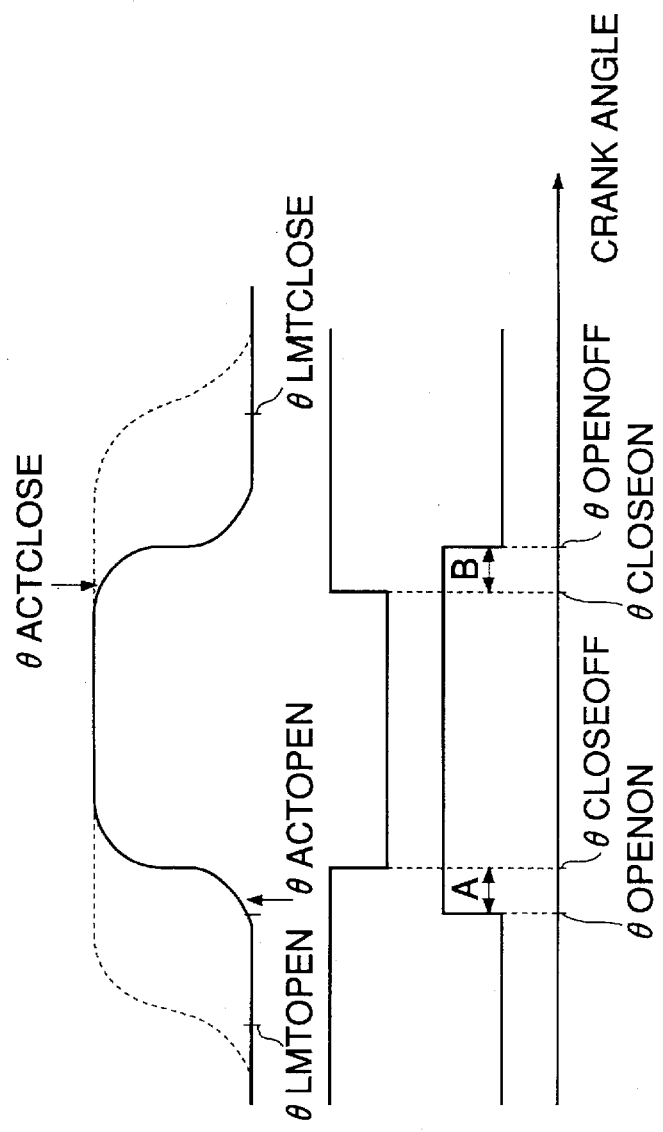
FIG.8A VALVE LIFT
FIG.8B VALVE-CLOSING SOLENOID VOLTAGE
FIG.8C VALVE-OPENING SOLENOID VOLTAGE

INTAKE/EXHAUST VALVE-OPENING/
CLOSING TIMING-CORRECTING ROUTINE

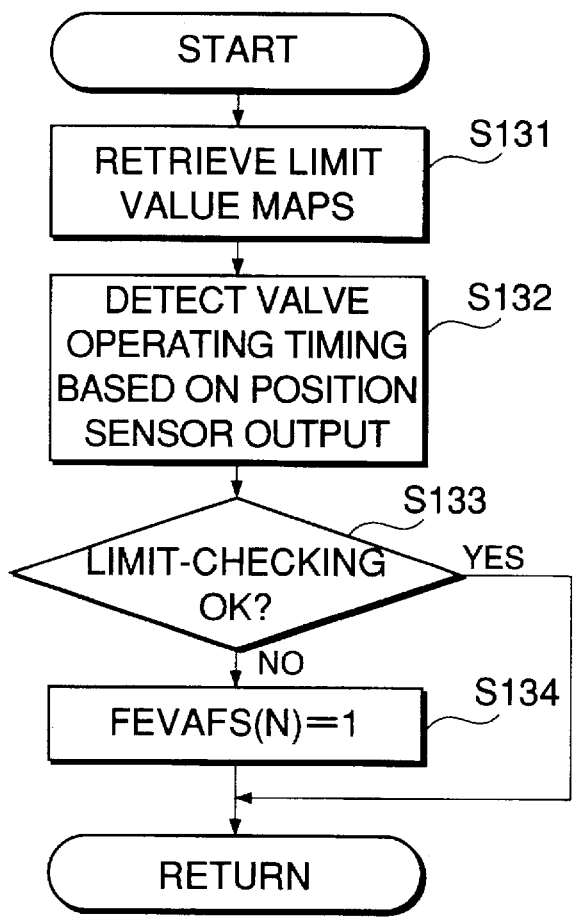

CONTROL SYSTEM FOR INTERNAL COMBUSTION ENGINES

BACKGROUND OF THE INVENTION

1. Field of the Invention

This invention relates to a control system for internal combustion engines, and more particularly to a control system for an internal combustion engine having intake valves and/or exhaust valves which are of an electromagnetically driven type.

2. Prior Art

A basic construction of an internal combustion engine having intake valves and/or exhaust valves of an electromagnetically driven type is disclosed by U.S. Pat. No. 3,882,833, in which the intake valves and/or exhaust valves are driven by means of springs and solenoids. Further, a control system for an internal combustion engine of this kind which employs the above basic construction is conventionally known, for example, from Japanese Laid-Open Patent Publication (Kokai) No. 2-112606, which is capable of changing the output timing of driving signals supplied to valve-driving solenoids according to the rotational speed of the engine.

Still further, an electromagnetically driven valve for use in the above basic construction has also been proposed, for example, by U.S. Pat. No. 5,222,714, which has an electromagnetic driving mechanism improved so as to reduce an electromagnetic force required for the solenoid to drive the valve used as an intake valve or exhaust valve.

The intake valves and exhaust valves of the electromagnetically driven type are not mechanically connected to the crankshaft of the engine, and therefore, if the engine has a plurality of cylinders, it is required to determine a cylinder of which intake valves and exhaust valves should be first started to be operated. However, none of the above-mentioned conventional prior arts contemplate this requirement, and therefore there is a fear that the operation of the intake valves and exhaust valves of each cylinder does not accurately correspond to the position of the piston of the cylinder, e.g. the intake valves can be opened during the exhaust stroke of the cylinder.

Further, according to the control system known from Japanese Laid-Open Patent Publication (Kokai) No. 2-112606, the energization-starting timing of a valve-opening solenoid just coincides with the energization-stopping timing of a valve-closing solenoid, and the energization-starting timing of the valve-closing solenoid just coincides with the energization-stopping timing of the valve-opening solenoid. As a result, the valve operation is unsatisfactory in promptness and reliability at the start of opening or closing of the valve.

Still further, none of the above-mentioned prior arts contemplate compensation for a variation in the air-fuel ratio of an air-fuel mixture actually drawn into each cylinder of the engine to achieve accurate air-fuel ratio control.

SUMMARY OF THE INVENTION

It is a first object of the invention to provide a control system for an internal combustion engine having a plurality of cylinders, which is capable of accurately controlling the operating timing of electromagnetically driven intake valves and/or exhaust valves of each cylinder at the start of the engine.

A second object of the invention is to provide a control system for an internal combustion engine, which is capable of controlling the operating timing of electromagnetically driven intake valves and/or exhaust valves of the engine such that they open or close exactly at opening or closing timing demanded by the driver.

A third object of the invention is to provide a control system for an internal combustion engine, which is capable of controlling electromagnetically driven intake valves and/or exhaust valves of the engine to promptly open or close at the start of the opening/closing operation of the valves.

A fourth object of the invention is to provide a control system for an internal combustion engine having electromagnetically driven intake valves and/or exhaust valves, which is capable of promptly coping with a change in the air-fuel ratio of an air-fuel mixture supplied to the engine, to thereby carry out air-fuel ratio control in a further accurate manner.

According to a first aspect of the invention, there is provided a control system for an internal combustion engine having a plurality of cylinders each having a piston, at least one intake valve, and at least one exhaust valve, and a crankshaft, the control system having electromagnetic driving means for electromagnetically causing opening and closing of at least one of the at least one intake valve and the at least one exhaust valve.

The control system is characterized by the improvement comprising:

the crank angle-detecting means for generating a crank angle signal whenever the crankshaft rotates through a predetermined angle;

cylinder position-detecting means for generating a cylinder-discriminating signal indicative of a predetermined crank angle of a particular cylinder of the plurality of the cylinders;

piston operating state-detecting means for detecting an operating state of the piston of each of the plurality of the cylinders, based on the crank angle signal generated by the crank angle-detecting means and the cylinder-discriminating signal generated by the cylinder position-detecting means; and valve operation control means for starting opening of the at least one of the at least one intake valve and the at least one exhaust valve, based on the operating state of the piston detected by the piston operating state-detecting means.

Preferably, the piston operating state-detecting means comprises means for allotting predetermined injection stages corresponding to respective different operating strokes of the engine, respectively, to the plurality of the cylinders and for setting a crank pulse stage in predetermined relation to the predetermined injection stages, in response to generation of the crank angle signal immediately after first generation of the cylinder-discriminating signal at the start of the engine, and means for detecting a position of the piston of each of the plurality of the cylinders from the predetermined injection stages and the crank pulse stage.

According to another aspect of the invention, there is provided a control system for an internal combustion engine installed in a vehicle having an accelerator pedal, the engine having at least one intake valve and at least one exhaust valve, at least one of the at least one intake valve and the at least one exhaust valve having a valve-opening electromagnetic element and a valve-closing electromagnetic element, the control system having electromagnetic driving means for electromagnetically causing opening and closing of the at least one of the at least one intake valve and the at least one exhaust valve. The control system is characterized by the improvement comprising:

accelerator pedal position-detecting means for detecting an operating amount of the accelerator pedal;

operating condition-detecting means for detecting at least one operating parameter of the engine at least including rotational speed of the engine; and energization-stopping timing-determining means for determining energization-stopping timing of the valve-opening electromagnetic element and energization-stopping timing of the valve-closing electromagnetic element, based on the at least one operating amount of the accelerator pedal detected by the accelerator pedal position-detecting means and the at least one operating parameter of the engine detected by the operating condition-detecting means;

wherein the electromagnetic driving means causes opening and closing of the at least one of the at least one intake valve and the at least one exhaust valve, based on the energization-stopping timing of the valve-opening electromagnetic element determined by the energization-stopping timing-determining means and the energization-stopping timing of the valve-closing electromagnetic element determined by the energization-stopping timing-determining means.

Preferably, the control system further includes energization-starting timing-determining means for determining energization-starting timing of the valve-opening electromagnetic element and energization-starting timing of the valve-closing electromagnetic element, based on the detected operating amount of the accelerator pedal, and the detected at least one operating parameter of the engine, the energization-starting timing-determining means setting the energization-starting timing of the valve-opening electromagnetic element to a time point which is earlier by a first time period than the energization-stopping timing of the valve-closing electromagnetic element and setting the energization-starting timing of the valve-closing electromagnetic element to a time point which is earlier by a second time period than the energization-starting timing of the valve-opening electromagnetic element.

More preferably, the valve-opening electromagnetic element and the valve-closing electromagnetic element each have a coil, the control system including temperature-detecting means for detecting temperature of the coil of at least one of the valve-opening electromagnetic element and the valve-closing electromagnetic element, the first and second predetermined time periods being set depending on the temperature of the coil detected by the temperature-detecting means and the at least one operating parameter of the engine detected by the operating condition-detecting means.

Preferably, the control system further includes air-fuel ratio-detecting means for detecting an air-fuel ratio of an air-fuel mixture supplied to the engine, desired air-fuel ratio-calculating means for calculating a desired air-fuel ratio of the air-fuel mixture, based on the detected operating amount of the accelerator pedal and the detected at least one operating parameter of the engine, and correcting means for correcting the energization-stopping timing of the valve-opening electromagnetic element and the energization-starting timing of the valve-closing electromagnetic element in the same direction, based on a difference between the air-fuel ratio detected by the air-fuel ratio detecting means and the desired air-fuel ratio calculated by the desired air-fuel ratio-calculating means.

Advantageously, the engine has a crankshaft, the correcting means correcting the energization-stopping timing of the valve-opening electromagnetic element and the energization-starting timing of the valve-closing electromagnetic element both in an advanced direction with respect to rotation of the crankshaft when the detected air-fuel ratio is larger than the calculated desired air-fuel ratio.

Also advantageously, the engine has a crankshaft, the correcting means correcting the energization-stopping timing of the valve-opening electromagnetic element and the energization-starting timing of the valve-closing electromagnetic element both in a retarded direction with respect to rotation of the crankshaft when the detected air-fuel ratio is smaller than the calculated desired air-fuel ratio.

The above and other objects, features and advantages of the invention will become more apparent from the following detailed description taken in conjunction with the accompanying drawings.

BRIEF DESCRIPTION OF THE DRAWINGS

FIG. 4 is a flowchart showing a routine for carrying out cylinder discrimination during cranking of the engine;

FIGS. 5A to 5D collectively form a timing chart which is useful in explaining INJ stages and a CRK stage: wherein FIG. 5A shows the timing of generation of CRK signal pulses;

FIG. 5B shows the timing of generation of CYL signal pulses;

FIG. 5C shows the INJ stages for the cylinders; and

FIG. 5D shows the CRK stage;

FIG. 7 is a flowchart showing a routine for controlling opening/closing operation of the intake valves and exhaust valves;

FIGS. 8A to 8C collectively form a timing chart useful in explaining the relationship between generation of driving signals for one of the intake valves and exhaust valves and a valve lift thereof: wherein FIG. 8A shows a change in the valve lift;

FIG. 8B shows a change in voltage applied to a valve-closing solenoid; and

FIG. 8C shows a change in voltage applied to a valve-opening solenoid;

FIG. 15 is a flowchart showing a routine for determining abnormality of the intake/exhaust valve opening/closing timing.

DETAILED DESCRIPTION

The invention will now be described in detail with reference to the drawings showing embodiments thereof.

Figure 1:
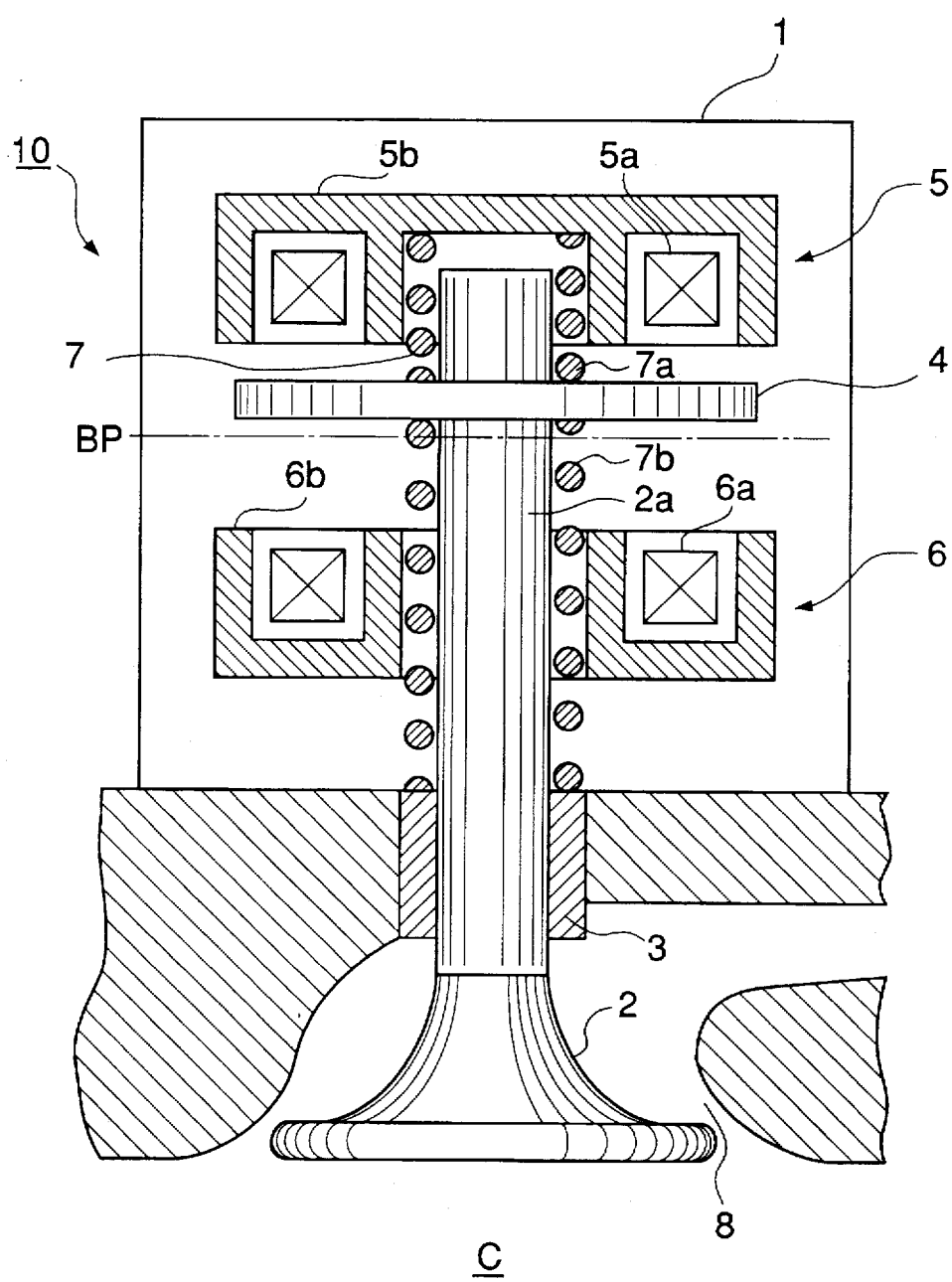
FIG. 1 is a longitudinal sectional view showing the construction of an electromagnetically driven intake valve which is controlled by a control system according to an embodiment of the invention.

Referring first to FIG. 1, there is illustrated the construction of an electromagnetically driven intake valve 10 employed in a control system according to an embodiment of the invention. The intake valve 10 is comprised of a valve element 2 which has a valve stem 2a with a magnetic element 4 as an armature secured thereon, and a valve-driving section 1 for driving the valve element 2. The intake valve 10 is mounted in a head of a cylinder block of an internal combustion engine at a location above a combustion chamber C in such a fashion that the valve element 2 is slidably fitted through a valve guide 3, for opening and closing an intake port 8 opening into the combustion chamber C. An exhaust valve of the engine, not shown, has the same construction as above, and is mounted in the head of the cylinder block of the engine at a location above the combustion chamber C for opening and closing an exhaust port, not shown, of the combustion chamber C.

The valve-driving section 1 is comprised of two solenoids (electromagnets) which are opposed to each other in the longitudinal direction, i.e. a valve-closing solenoid 5 for biasing the valve element 2 in a valve-closing direction and a valve-opening solenoid 6 for biasing the valve element 2 in a valve-opening direction, and a spring 7 interposed between the valve-closing solenoid 5 and the valve guide 3. The valve-closing solenoid 5 is comprised of a coil 5a and a core member 5b, while the valve-opening solenoid 6 is comprised of a coil 6a and a core member 6b. The spring 7 is comprised of a first coiled spring 7a interposed between the core member 5b and the armature 4, and a second coiled spring 7b interposed between the armature 4 and the valve guide 3, the first and second springs 7a, 7b being disposed such that the biasing force of the spring 7 becomes zero when the armature 4 is positioned in a balanced or neutral position BP. The spring 7 acts to bias the valve element 2 in the valve-opening direction when the armature 4 is positioned upward of the neutral position BP as viewed in the figure, and it acts to bias the valve element 2 in the valve-closing direction when the armature 4 is position downward of the neutral position BP.

With the above arrangement, by selectively energizing the valve-closing solenoid 5 or the valve-opening solenoid 6 with driving current, the valve element 2 moves between a fully closed position in which the the valve element 2 fully closes the intake port 8, and a fully open position in which the lift of the valve element 2 is the maximum. When neither the solenoid 5 nor the solenoid 6 is energized, the valve element 2 is positioned in the neutral position BP intermediate between the fully closed position and the fully open position.

Figure 2:
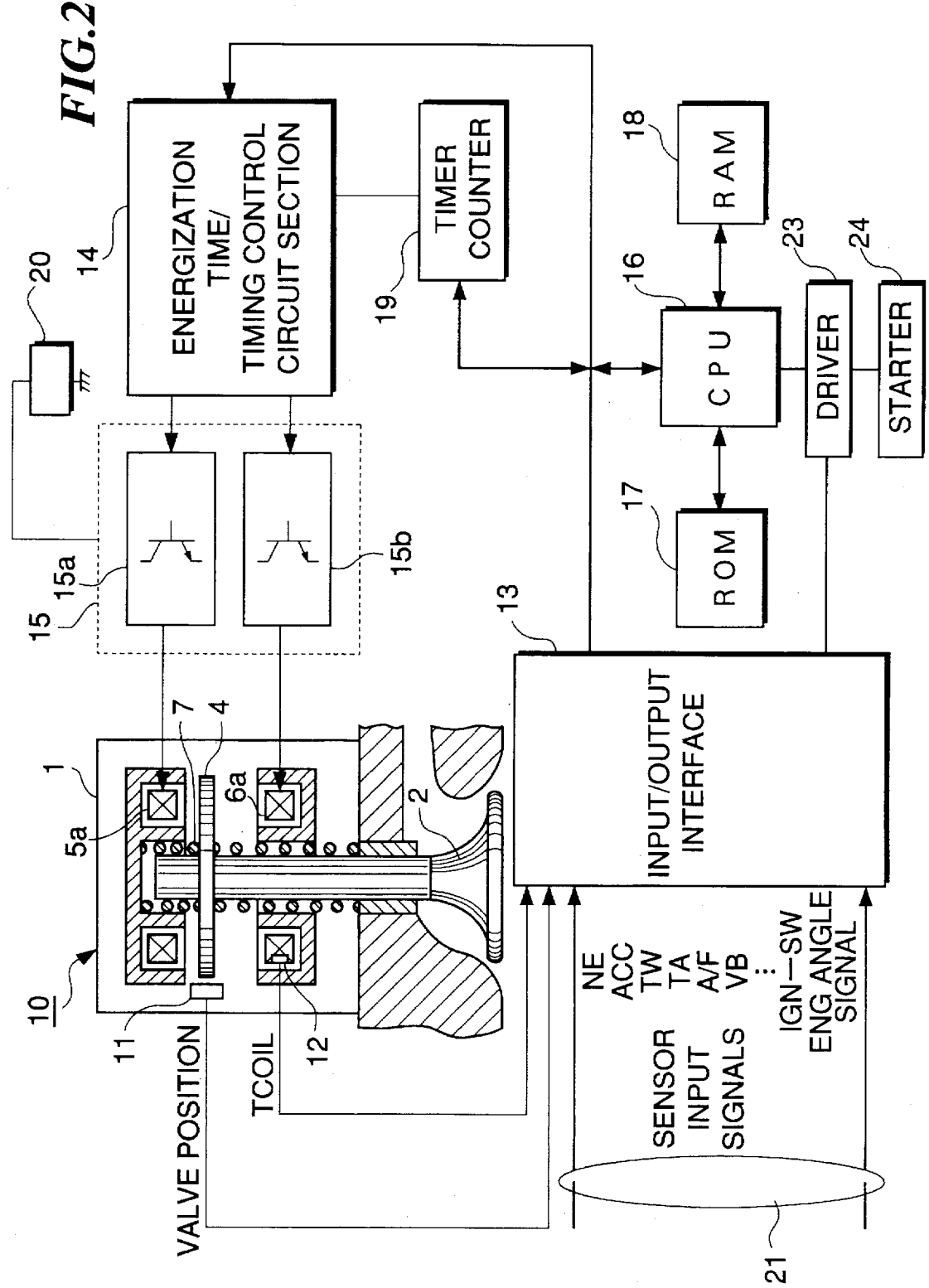
FIG. 2 is a schematic diagram showing the whole arrangement of the control system according to the embodiment.

FIG. 2 schematically shows the whole arrangement of the control system according to the embodiment, incorporating the above described intake valve 10. In the figure, the valve-driving section 1 of the intake valve 10 is provided with a position sensor 11 for detecting the position of the armature 4, and a temperature sensor 12 for detecting the temperature TCOIL of the valve-opening solenoid 6, signals indicative of the respective detected parameter values being supplied via an input/output interface 13 to a CPU (central processing unit) 16 as well as to an energization time/timing control circuit section 14. Further connected via the input/output interface 13 to the CPU 16 are other sensors 21 for detecting various parameters including the engine rotational speed NE, the operating amount of an accelerator pedal (hereinafter referred to as "the accelerator pedal position") θACC of a vehicle in which the engine is installed, engine coolant temperature TW, intake temperature TA, the air-fuel ratio A/F of an air-fuel mixture, battery voltage BV, crankshaft rotational angle, and on/off states of an ignition switch of the engine, and supplying electric signals indicative of the respective detected parameter values to the CPU 16 and the energization time/timing control circuit section 14. Also connected via a driver 23 to the input/output interface 13 is a starter 24 for starting the engine.

In the present embodiment, the signals indicative of the crankshaft rotational angle are represented by a signal pulse which is generated at a predetermined crank angle of a particular cylinder of the engine whenever the crankshaft rotates through 720 degrees (hereinafter referred to as "a CYL signal pulse"), and a signal pulse which is generated at each of predetermined crank angles whenever the crankshaft rotates through 30 degrees (hereinafter referred to as "a CRK signal pulse").

Also connected to the CPU 16 are a ROM 17 storing operational programs which are executed by the CPU 16, etc., and a RAM 18 for storing data of results of calculations carried out by the CPU 16, detected parameter data from the sensors, etc. Further, a timer counter 19 functioning as a timer is connected to the energization time/timing control circuit section 14. The timer counter 19 is also connected to the CPU 16 to have its count value set by the CPU 16.

The energization time/timing control circuit section 14 is connected to a driver circuit 15 which is comprised of a valve-closing solenoid-driving circuit 15a connected to the coil 5a of the valve-closing solenoid 5 and a valve-opening solenoid-driving circuit 15b connected to the coil 6a of the valve-opening solenoid 6. A battery 20 is connected to the driver circuit 15 which is supplied with electric power therefrom. The control circuit section 14 controls supply of electric current to the coils 5a and 6a to energize or deenergize the same.

Further, components circuits other than the driver circuit 15 including the CPU 16, ROM 17, input/output interface 13, etc. are supplied with supply voltage from the battery 20 via power circuits, not shown.

The engine to which is applied the present embodiment is a four-cylinder engine in which each cylinder is provided with two intake valves and two exhaust valves, and therefore totally 16 electromagnetically driven valves are used. The energization time/timing control circuit section 14, driver circuit 15, and timer counter 19 are provided for each of the 16 valves.

The CPU 16 determines the opening timing and closing timing of each of the intake and exhaust valves in response to input signals from the above various sensors, to thereby set the timer counter 19 for each of the intake and exhaust valves.

Further, a fuel injection valve, not shown, is provided for each cylinder in the intake pipe of the engine, opening operation of which is controlled by the CPU 16. The CPU 16 also carries out control for outputting and delivering an ignition command signal to a spark plug of each cylinder.

Immediately after the ignition switch is turned on, electric current is not applied to the solenoids 5 and 6, and accordingly the valve element of each of the intake and exhaust valves is in the neutral position BP.

Figure 3:
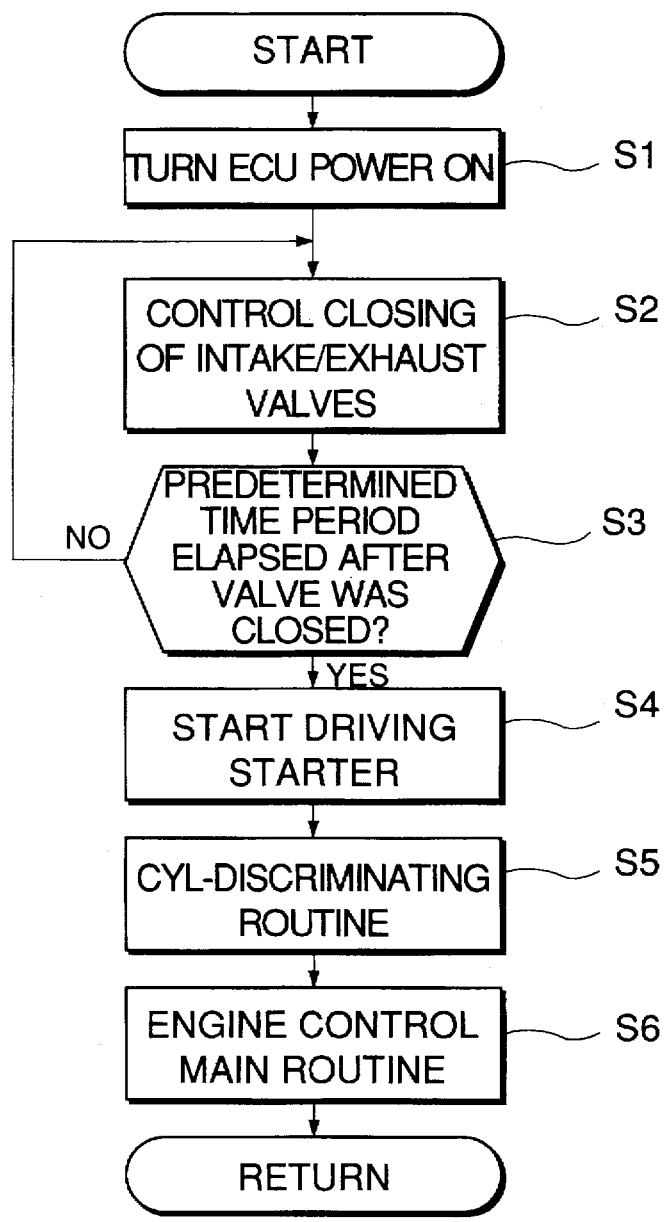
FIG. 3 is a flowchart showing a routine for controlling the engine operation during cranking of the engine.

FIG. 3 shows a routine for controlling the engine operation during cranking of the engine. When a power source for the control system (ECU) of FIG. 2 is turned on at a step S1, command signals are outputting for closing all the intake valves and exhaust valves at a step S2, and the CPU 16 is kept waiting until a predetermined time period elapses after the outputting of the command signals, at a step S3. After the predetermined time period has elapsed, a signal for driving the starter 24 is outputting at a step S4, and then a cylinder-discriminating routine and an engine control main routine, described hereinafter, are executed at steps S5 and S6, respectively.

FIG. 4 shows a routine for carrying out the cylinder discrimination, which is executed at the step S5 in FIG. 3.

First, at a step S10, it is determined whether or not a cylinder discrimination completion flag FDET is set to "0". The cylinder discrimination completion flag FDET indicates that cylinder discrimination has been completed, when set to "1". If the answer is negative (NO), the program is immediately terminated. On the other hand, if the answer is affirmative (YES), it is determined at a step S11 whether or not a cylinder discrimination flag FCYL is set to "1". The flag FCYL indicates that a CYL signal pulse (see FIG. 5B) has just been generated, when set to "1". If FCYL=0 holds, then at a step S14, a fuel cut flag FFC which indicates that fuel supply should be interrupted, when set to "1", and an ignition cut flag FIGC which indicates that an ignition command signal should be interrupted, when set to "1", are both set to "1", and at the same time the cylinder discrimination completion flag FDET is set to "0", followed by terminating the present routine.

If a CYL signal pulse has been generated, then FCYL=1 holds at the step S11, the program proceeds to a step S11A, wherein the flag FDET is set to "1", and then a step S12 is executed, wherein an INJ stage for each cylinder and a CRK stage are set, i.e. initializations of the INJ stages and the CRK stage are executed. The INJ stages for the cylinders are initialized, as shown in FIG. 5C, such that when a first CRK signal pulse has been generated after generation of a first CYL signal pulse, a #1 cylinder is set to a #15 stage, a #3 cylinder to a #9 stage, a #4 cylinder to a #3 stage, and a #2 cylinder to a #21 stage, respectively. Thereafter, each stage is incremented by "1" whenever a CRK signal pulse is generated (except that a #0 stage follows a #23 stage). With the injection stages thus set, stages #0–#5 correspond to a compression stroke, stages #6–#11 to an explosion stroke, stages #12–#17 to an exhaust stroke, and stages #18–#23 to a suction stroke, respectively. If a CYL signal pulse is generated at a crank angle position different from a position at which the above-mentioned CYL signal pulse was generated, initialization of the stages can be different from the above-mentioned initialization.

Further, in the illustrated example, the CRK stage is initially set to a #3 stage, and thereafter incremented by "1" whenever a CRK signal pulse is generated (except that a #0 stage follows a #5 stage).

Referring again to FIG. 4, at a step S13, the fuel cut flag FFC and the ignition cut flag FIGC are both set to "0", followed by terminating the present routine.

By executing the FIG. 4 program, the suitable INJ stages and CRK stage corresponding to the piston position of each cylinder can be obtained, whereby the opening/closing timing of each of the intake valves and exhaust valves can be correctly controlled.

Figure 6:
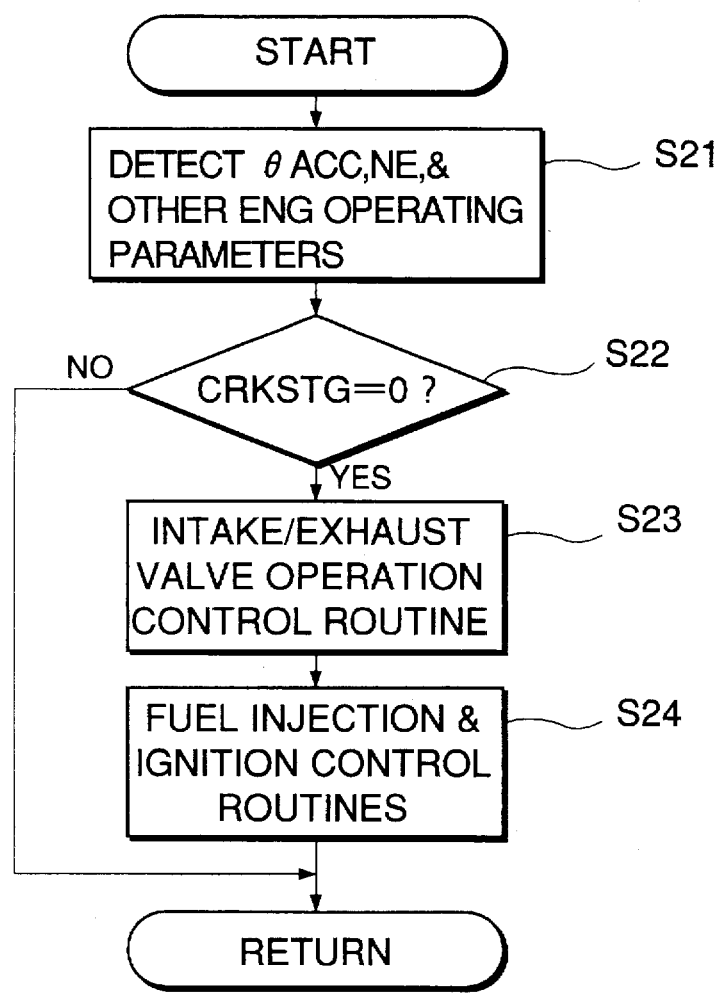
FIG. 6 is a flowchart showing a main routine for carrying out engine operation control.

FIG. 6 shows a main routine for carrying out the engine control main routine employed at the step S6 in FIG. 3, which is executed in synchronism with generation of CRK signal pulses.

At a step S21, engine operating parameters such as the accelerator pedal position θACC and the engine rotational speed NE are detected, and then it is determined at a step S22 whether or not the present CRK stage CRKSTG is a #0 stage. If CRKSTG≠0 holds, the program is immediately terminated.

If CRKSTG=0 holds, an intake/exhaust valve opening/closing operation control routine is executed at a step S23, and then a fuel injection control routine and an ignition control routine are executed in conventional manners at a step S24, followed by terminating the present routine.

FIG. 7 shows details of the above-mentioned intake/exhaust valve opening/closing operation control routine. FIG. 8 shows changes in a valve lift of one of the intake/exhaust valves, and changes in voltage applied to the valve-opening solenoid 6 and the valve-closing solenoid 5. First, the outline of control of energization of the solenoids will be described with reference to FIG. 8.

According to the present embodiment, the valve-opening operation of each of the intake valves and exhaust valves is controlled such that energization of the valve-opening solenoid 6 is started at a time point θOPENON which is earlier by a first overlap time interval A than a time point θCLOSEOFF at which energization of the valve-closing solenoid 5 is stopped. Thus, the valve element 2 starts opening, and then energization of the valve-closing solenoid 5 is stopped, whereby the valve element 2 promptly and positively moves into the fully open position. The valve-closing operation is carried out such that energization of the valve-closing solenoid 5 is started at a time point θOPENOFF which is earlier by a second overlap time period B than a time point θCLOSEON at which energization of the valve-opening solenoid 6 is stopped. Thus, the valve element 2 starts closing, and then energization of the valve-opening solenoid 6 is stopped, whereby the valve element promptly and positively moves into the fully closed position.

Next, a manner of calculating the starting/stopping timing of energization of the solenoids will be described in detail with reference to FIG. 7.

Figure 9A:
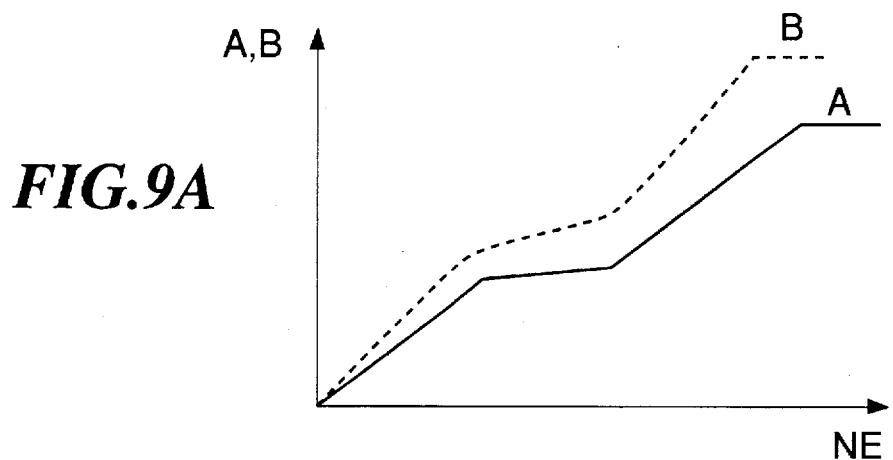
FIG. 9A shows a table for determining overlap time periods A and B according to the engine rotational speed NE.
Figure 9B:
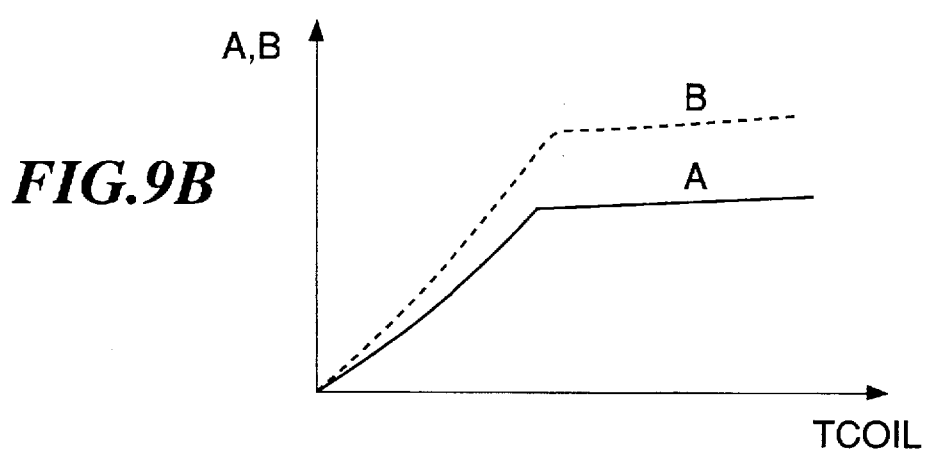
FIG. 9B shows a table for determining the overlap time periods A and B according to the coil temperature TCOIL.
Figure 9C:
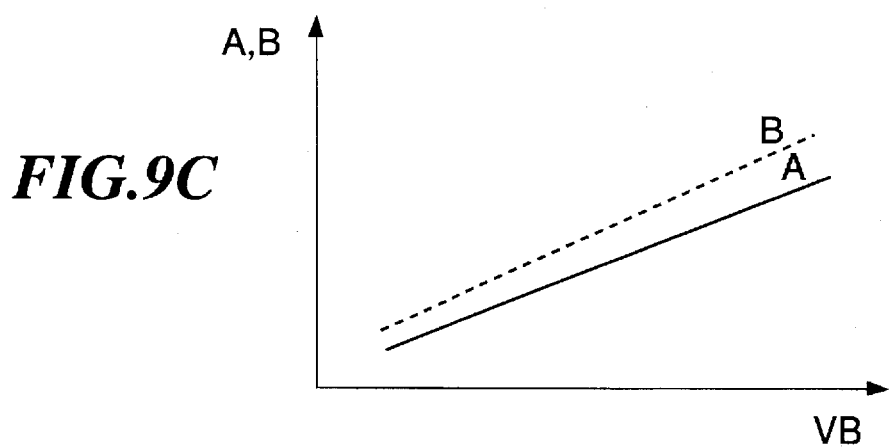
FIG. 9C shows a table for determining the overlap time periods A and B according to the battery voltage VB.

First, at a step S30, the cylinders are set to the exhaust stroke, suction stroke, compression stroke, and explosion stroke, respectively, based on the INJ stages set for the cylinders, respectively. Then, at steps S31 to S34, calculations are made of the energization-stopping timing and energization-starting timing of the valve-closing solenoid 5 and the valve-opening solenoid 6 of the cylinders which have been set to the exhaust stroke and the suction stroke at the step S30. More specifically, at the step S31, the energization-stopping time point θCLOSEOFF for the valve-closing solenoid 5 is calculated by retrieving a map, not shown, which is set according to the accelerator pedal position θACC and the engine rotational speed NE. Then, at the step S32 the energization-starting time point θOPENON for the valve-opening solenoid 6 is calculated by the use of the following equation (1):

$$\theta OPENON = \theta CLOSEOFF - A \tag{1}$$

where the first overlap time period A is determined according to the engine rotational speed NE, the coil temperature TCOIL, and the battery voltage VB, as shown in FIGS. 9A to 9C, respectively. More specifically, the A value is determined by retrieving a map, not shown, which is set according to the NE value and the TCOIL value, and further by correcting the A value read from the map, based on the battery voltage VB.

At the step S33, similarly to the step S31, the energization-stopping time point θCLOSEOFF for the valve-opening solenoid 6 is calculated by retrieving a map, not shown, which is set according to the accelerator pedal position θACC and the engine rotational speed NE. Then, at the step S34 the energization starting-time point θCLOSEON for the valve-closing solenoid 5 is calculated by the use of the following equation (2):

$$\theta CLOSEON = \theta OPENOFF - B \tag{2}$$

where the second overlap time period B is determined according to the engine rotational speed NE, the coil temperature TCOIL, and the battery voltage VB, as shown in FIGS. 9A to 9C, respectively, similarly to the first overlap tie period A. The voltage to be supplied to the solenoid-driving circuit 15 may be stabilized battery voltage. In such a case, correction of the energization starting-time point θCLOSEON by the B value may be omitted.

Next, an intake/exhaust valve closing timing-correcting routine is executed at a step S35, and then a valve-opening/closing solenoid energization routine is executed at a step S36, followed by terminating the present routine.

By determining the energization-stopping timing according to the accelerator pedal position θACC, the engine rotational speed NE, the coil temperature TCOIL, and the battery voltage VB in the above described manner, the valve can be opened or closed exactly at opening or closing timing demanded by the driver.

Figure 10:
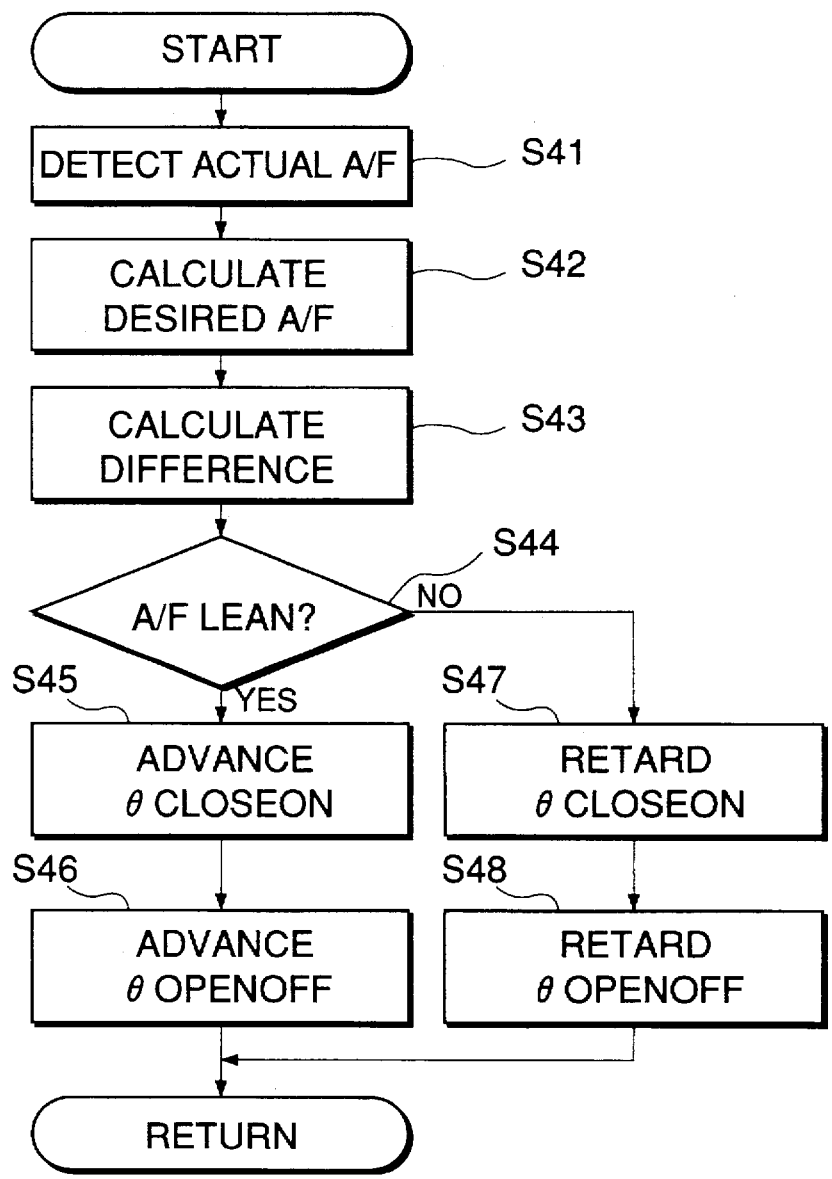
FIG. 10 is a flowchart showing a routine for carrying out intake/exhaust valve closing timing correction.

FIG. 10 shows details of the intake/exhaust valve closing timing-correcting routine. First, at a step S41, a value of actual air-fuel ratio AFACT detected by a linear-output oxygen concentration sensor arranged in the exhaust system of the engine is read in, and then, at a step S42, a value of desired air-fuel ratio AFCMD is calculated based on engine operating conditions, basically based on the accelerator pedal position θACC and the engine rotational speed NE. Then, at a step S43, a difference DAF between the value of actual air-fuel ratio AFACT and the value of desired air-fuel ratio AFCMD is calculated, and it is determined at a step S44 whether or not the value of actual air-fuel ratio AFACT is larger or leaner than the value of desired air-fuel ratio AFCMD.

If the answer is affirmative (YES), the energization-starting time point θCLOSEON for the valve-closing solenoid 5 and the energization-stopping time point θOPENOFF for the valve-opening solenoid 6 are corrected in an advanced direction at steps S45 and 46, respectively, followed by terminating the present routine. On the other hand, if the answer is negative (NO), i.e. if the value of the actual air-fuel ratio AFACT is smaller or richer than the value of the desired air-fuel ratio AFCMD, the energization-starting time point θCLOSEON for the valve-closing solenoid 5 and the energization-stopping time point θOPENOFF for the valve-opening solenoid 6 are corrected in a retarded direction at steps S47 and 48, respectively, followed by terminating the present routine.

By thus correcting the energization-starting time point θCLOSEON for the valve-closing solenoid 5 and the energization stopping time point θOPENOFF for the valve-opening solenoid 6 in the advanced direction, the valve opening period is decreased and hence the amount of intake air decreases, to thereby correct the air-fuel ratio in an enriching direction. On the other hand, by thus correcting the energization-starting time point θCLOSEON for the valve-closing solenoid 5 and the energization-stopping time point θOPENOFF for the valve-opening solenoid 6 in the retarded direction, the air-fuel ratio can be corrected in a leaning direction. Thus, the air-fuel ratio can be corrected according to changes in operating conditions of the engine occurring after completion of the calculation of the fuel injection amount, to thereby achieve engine operation based on an optimal air-fuel ratio.

The valve opening period can be corrected by correcting both the energization-stopping time point θCLOSEOFF of the valve-closing solenoid 5 and the energization-starting time point θOPENON of the valve-opening solenoid 6, which, however, requires a complicated calculation. Therefore, it is desirable that the closing time points of the intake valves and exhaust valves should be controlled as described above.

Figure 11:
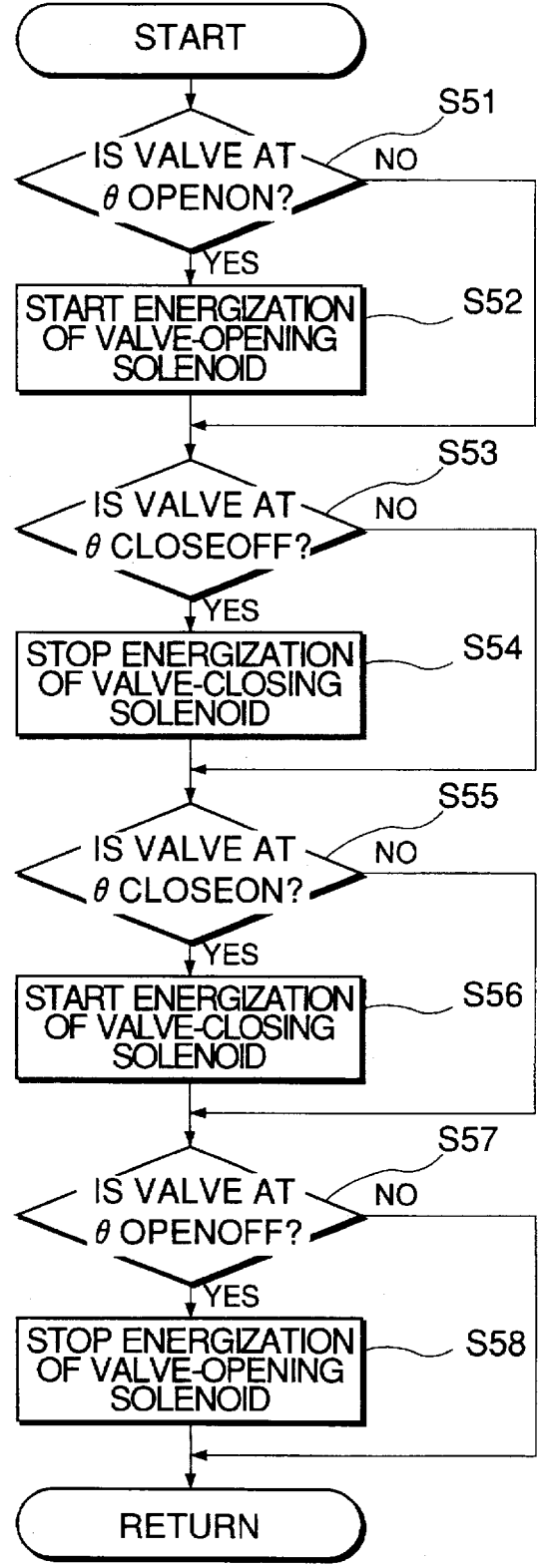
FIG. 11 is a flowchart showing a routine for carrying out valve-opening/closing solenoid energization control.

FIG. 11 shows details of the valve-opening/closing solenoid energization routine executed at the step S36 in FIG. 7. The present routine carries out actual energization of the valve opening/closing solenoids 5, 6 based on the above calculated solenoid energization-starting/stopping time points. The intake valves and the exhaust valves to be opened by this routine are those of a cylinder during the suction stroke and those of a cylinder during the exhaust stroke, respectively.

First, it is determined at a step S51 whether or not the energization-starting time point θOPENON for the valve-opening solenoid 6 has been reached. If the answer is affirmative (YES), energization of the valve-opening solenoid 6 is started at a step S52. Then, it is determined at a step S53 whether or not the energization-stopping time point θCLOSEOFF for the valve-closing solenoid 5 has been reached. If the answer is affirmative (YES), energization of the valve-closing solenoid 5 is stopped at a step S54. Then, it is determined at a step S55 whether or not the energization-starting time point θCLOSEON for the valve-closing solenoid 5 has been reached. If the answer is affirmative (YES), energization of the valve-closing solenoid 5 is started at a step S56. Next, it is determined at a step S57 whether or not the energization-stopping time point θOPENOFF for the valve-opening solenoid 6 has been reached. If the answer is affirmative (YES), energization of the valve-opening solenoid 6 is stopped at a step S58.

If neither the energization-starting time point nor the energization-stopping time point has been reached, the program is immediately terminated.

Next, description will be made of another embodiment of the invention. Steps corresponding to those in the first embodiment are designated by identical numerals, description thereof being omitted.

Figure 12:
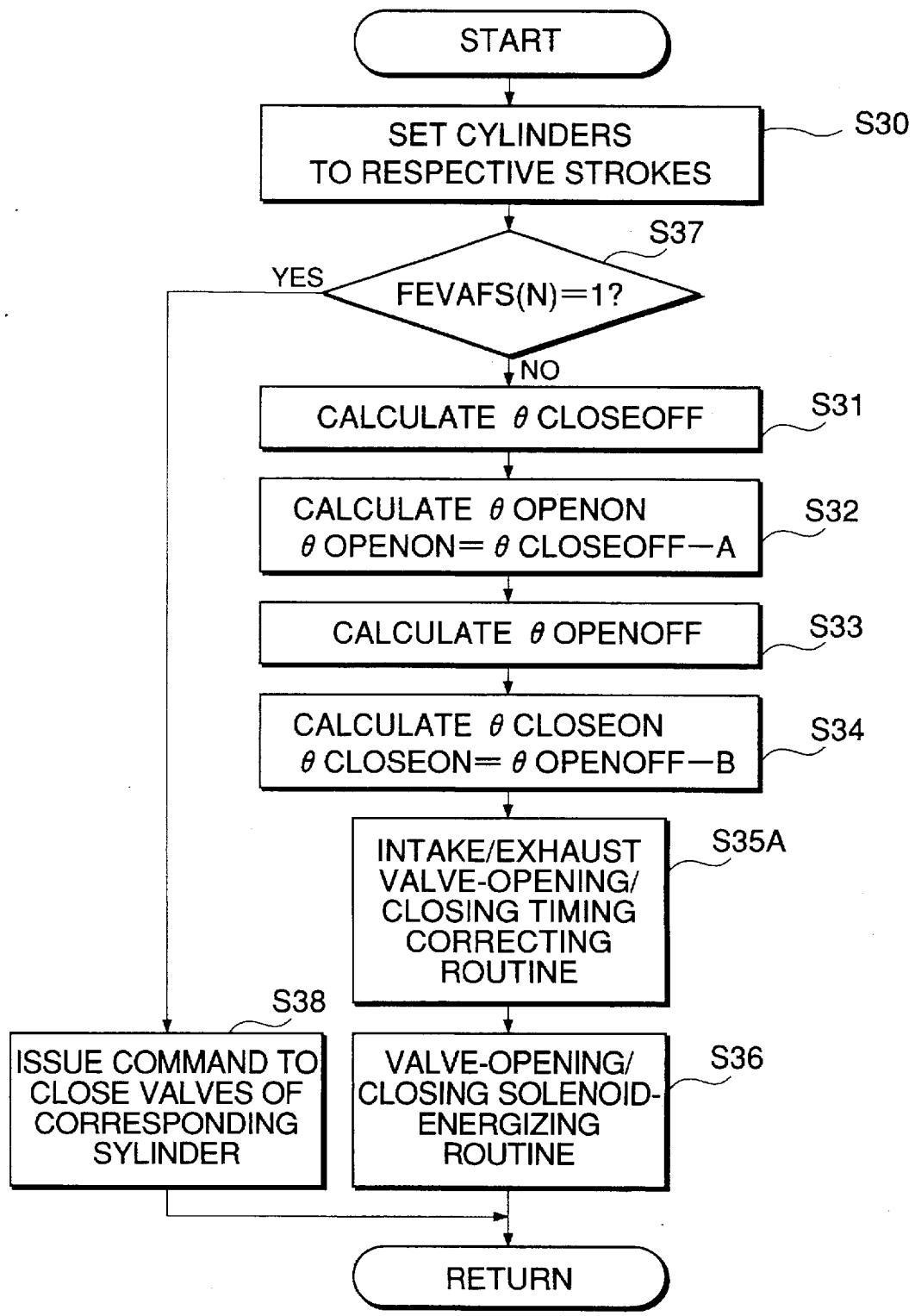
FIG. 12 is a flowchart showing a routine for controlling opening/closing operation of the intake valves and exhaust valves, according to another embodiment of the invention.

FIG. 12 shows details of the intake/exhaust valve operation control routine executed at the step S23 in FIG. 6, according to the present embodiment. The routine is identical with the routine of FIG. 7, except for steps S35A, S37, and S38, and therefore only these steps will be described hereinbelow. Further, the relationship between the valve lift of each of the intake/exhaust valves and the voltage applied to the valve-opening solenoid 6 and the valve-closing solenoid 5 is identical with the relationship shown in FIG. 8 in the first embodiment, and description thereof is therefore omitted.

At a step S37 in FIG. 12, it is determined whether or not an abnormality determination flag FEVAFS(N) is set to "1".

The abnormality determination flag FEVAFS(N) indicates that the valve opening and/or closing time point of the intake valve or exhaust valve is abnormal, when set to "1". The flag FEVAFS(N) is provided for each cylinder and set by an abnormality-determining routine of FIG. 15, described hereinafter. A symbol (N) in the flag FEVAFS(N) indicates the number of a cylinder to which the flag is allotted.

If FEVAFS(N)=1 holds at the step S37, which indicates that the opening and/or closing time point of the intake valve or exhaust valve of the #N cylinder is abnormal, valve-closing command signals are output and delivered to the intake valves and exhaust valves of the #N cylinder at a step S102 to forcibly close them, followed by terminating the present routine. At the same time, fuel supply to the #N cylinder is forcibly interrupted.

If the answer to the question of the step S37 is negative (NO), i.e. if FEVAFS(N)=0 holds, the program proceeds to the step S31 et seq., wherein calculation of the energization-starting/stopping time points of the intake valves and exhaust valves is carried out.

After the energization-starting time point θCLOSEON of the valve-closing solenoid 5 is calculated at the step S34, the program proceeds to a step S35A wherein an intake/exhaust valve opening/closing timing-correcting routine is executed, and then an valve-opening/closing solenoid energization routine identical with the step S36 in the first embodiment is executed at a step S36, followed by terminating the present routine.

In this connection, in the first embodiment the first overlap time period A calculated at the step S32 and the second overlap time period B calculated at the step S34 are calculated by correcting map values determined by the engine rotational speed NE and the coil temperature TCOIL, based on the battery voltage VB. In the present embodiment, however, determined map values of the A and B values may not be corrected based on the battery voltage.

Figure 13:
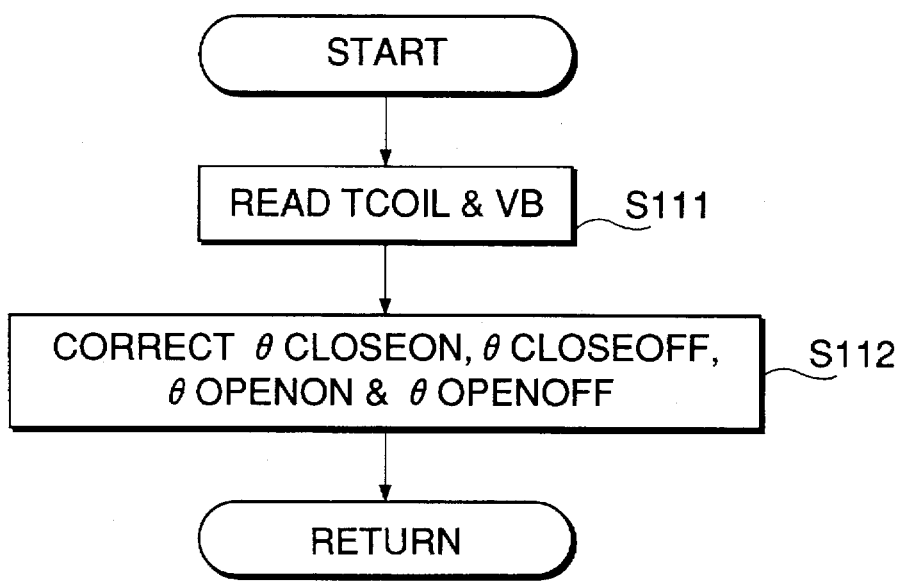
FIG. 13 is a flowchart showing a routine for carrying out intake/exhaust valve opening/closing timing correction according to the embodiment of FIG. 12.
Figure 14A:
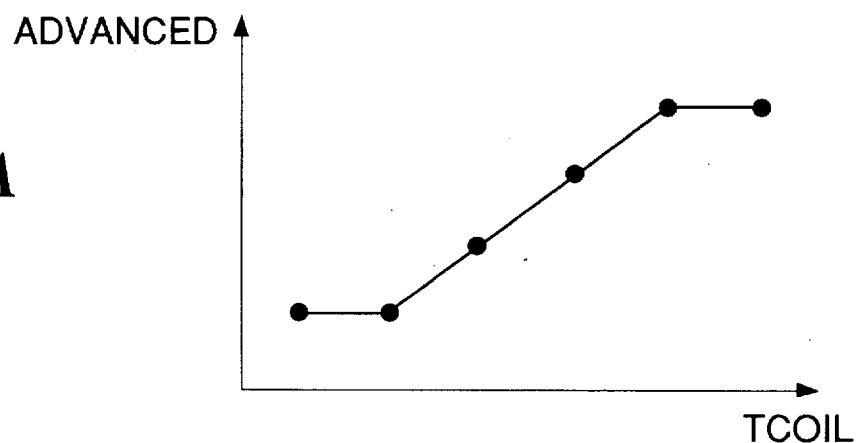
FIGS. 14a and 14b show tables for determining a correction amount of the valve opening/closing timing according to the coil temperature and battery voltage respectively.
Figure 14B:
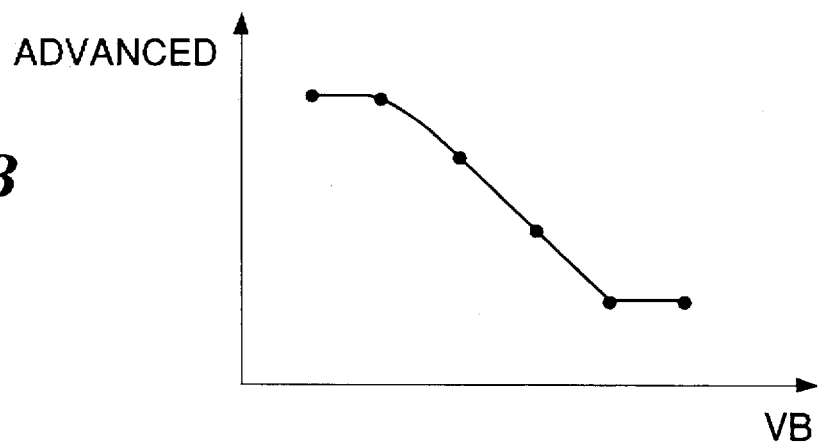

FIG. 13 shows details of the intake/exhaust valve opening/closing timing-correcting routine executed at the step S35A in FIG. 12. First, at a step S111, the coil temperature TCOIL and the battery voltage VB are read in, and then at a step S112, the energization-starting/stopping time points for the valve-closing solenoid 5 and the valve-opening solenoid 6 are corrected according to the read coil temperature TCOIL and the read battery voltage VB. More specifically, the energization-starting/stopping time points are corrected in the advanced direction as the coil temperature TCOIL is higher, as shown in FIG. 14A, and as the battery voltage VB is lower, as shown in FIG. 14B.

The valve-opening/closing solenoid energization routine executed at the step S36 in FIG. 12 is identical with the routine of FIG. 11, and description thereof is therefore omitted.

FIG. 15 shows a routine for determining whether or not the intake/exhaust valve-opening/closing timing is abnormal.

First, at a step S131, a valve opening limit value θLMTOPEN and a valve closing limit value θLMTCLOSE are determined by retrieving respective maps, not shown, which are set according to the accelerator pedal position θACC and the engine rotational speed NE. Then, at a step S132, an actual valve opening-starting time point θACTOPEN and an actual valve closing-starting time point θACTCLOSE of the valve element 2 are detected based on an output from the position sensor 11 (see FIG. 4A). At the following step S133, limit-checking of the detected time points θACTOPEN and θACTCLOSE is executed.

More specifically, the valve opening-starting time point θACTOPEN and the valve closing-starting time point θACTCLOSE are compared with the valve opening limit value θLMTOPEN and the valve closing limit value θLMTCLOSE, respectively, and if the θACTOPEN value is on a side advanced relative to the θLMTOPEN value, or if the θACTCLOSE value is on a side retarded relative to the θLMTCLOSE value, it is determined that the θACTOPEN value or θACTCLOSE value of the valve element 2 does not pass the limit-checking.

If the θACTOPEN and θACTCLOSE values pass the limit-checking, the program is immediately terminated, whereas if either the θACTOPEN value or the θACTCLOSE value does not pass the limit-checking, the abnormality determination flag FEVAFS(N) is set to "1" at a step S134, followed by terminating the present routine.

According to the present routine, deviation in the intake/exhaust valve opening/closing timing due to aging or failure of the intake valve(s) or exhaust valve(s) or driving system (s) thereof can be accurately detected.

Further, according to the present embodiment, if it is determined that the intake/exhaust valve opening/closing timing is abnormal, the intake valves and exhaust valves of the corresponding cylinder are all forcibly closed and fuel supply to the cylinder is forcibly interrupted. As a result, the intake valves and exhaust valves can be prevented from colliding with the piston of the cylinder, etc., and hence damage or breakdown of the valves can be prevented. Further, unburnt gases can be prevented from being emitted from the cylinder into the atmosphere, to thereby restrain degradation of exhaust emission characteristics of the engine.

Although in the present embodiment, when FEVAFS(N) =1 holds at the step S37 in FIG. 12, the intake valves and exhaust valves of the corresponding cylinder alone are forcibly closed and fuel supply to the cylinder is forcibly interrupted, this is not limitative. Alternatively, when FEVAFS(N)=1 holds at any of the cylinders or at a predetermined number of cylinders (e.g. 2), the intake valves and exhaust valves of all the cylinders may be forcibly closed and fuel supply to all the cylinders forcibly interrupted.

What is claimed is:

1. In a control system for an internal combustion engine having a plurality of cylinders each having a piston, at least one intake valve, and at least one exhaust valve, and a crankshaft, said control system having electromagnetic driving means for electromagnetically causing opening and closing of at least one of said at least one intake valve and said at least one exhaust valve, the improvement comprising:
crank angle-detecting means for generating a crank angle signal whenever said crankshaft rotates through a predetermined angle;
cylinder position-detecting means for generating a cylinder-discriminating signal indicative of a predetermined crank angle of a particular cylinder of said plurality of said cylinders;

piston operating state-detecting means for detecting an operating state of said piston of each of said plurality of said cylinders, based on said crank angle signal generated by said crank angle-detecting means and said cylinder-discriminating signal generated by said cylinder position-detecting means; and valve operation control means for starting opening of said at least one of said at least one intake valve and said at least one exhaust valve, based on said operating state of said piston of each of said plurality of said cylinders detected by said piston operating state-detecting means.

2. A control system as claimed in claim 1, wherein said piston operating state-detecting means comprises means for allotting predetermined injection stages corresponding to respective different operating strokes of said engine, respectively, to said plurality of said cylinders and for setting a crank pulse stage in predetermined relation to said predetermined injection stages, in response to generation of said crank angle signal immediately after first generation of said cylinder-discriminating signal at the start of said engine, and means for detecting a position of said piston of each of said plurality of said cylinders from said predetermined injection stages and said crank pulse stage.

* * * * *